United States Patent
Saltsman et al.

[11] 3,982,330
[45] Sept. 28, 1976

[54] METHOD AND APPARATUS FOR SIMULATING IN A MODEL THE DISBURSEMENT OF GAS AND DUST IN A MINE

[75] Inventors: Robert D. Saltsman; Robert D. Harris, both of Delmont, Pa.

[73] Assignee: Bituminous Coal Research, Inc., Monroeville, Pa.

[22] Filed: Aug. 6, 1975

[21] Appl. No.: 602,391

[52] U.S. Cl. .................................. 35/13; 35/49
[51] Int. Cl.² .................................. G09B 25/02
[58] Field of Search .............. 35/13, 1, 10, 49, 50, 35/51

[56] References Cited
UNITED STATES PATENTS

| | | | |
|---|---|---|---|
| 727,140 | 5/1903 | Hill et al. | 35/10 |
| 1,143,938 | 6/1915 | Bricker | 35/10 |
| 1,472,475 | 10/1923 | Johnston | 35/51 |
| 1,594,673 | 8/1926 | Kreutzer et al. | 35/49 X |
| 2,422,179 | 6/1947 | Brewster | 35/13 |
| 2,710,459 | 6/1955 | Danis | 35/13 |
| 2,790,253 | 4/1957 | Ayer | 35/49 |

*Primary Examiner*—William H. Grieb
*Attorney, Agent, or Firm*—Stanley J. Price, Jr.; John M. Adams

[57] ABSTRACT

A model for simulating the emission of gas and dust in a mine during a continuous mining operation includes a tank and an inlet conduit for conducting fluid into the tank. A substantially rectangular housing is positioned in the tank and submerged in the fluid. The housing simulates a mine entryway and comprises a pair of sidewalls and top and bottom walls connected thereto, with a sealed end portion and an open end portion. A foraminous member secured to the open end portion directs fluid from the tank into the housing. Indicia medium, such as a dye, is directed from a reservoir to the foraminous member where the indicia medium and fluid are mixed. The indicia medium and fluid pass through the foraminous member into the housing and provide a visual indication of simulated emission of gas and dust from a mine face. The simulated impurities are diverted into a partitioned area of the housing and withdrawn from the housing through a simulated exhaust pipe. An additional feature includes the simulation of exhaust tubing having an inlet positioned adjacent the mine face and operable to withdraw the gas and dust emitted therefrom during the mining operation. The model also demonstrates mine ventilation control by supplying fresh air to the mine face through a ventilation pipe and removing the gas and dust generated from the mine face through an exhaust pipe. The conduit simulating the ventilation pipe may be moved laterally across the foraminous member to withdraw the indicia medium and fluid passing therethrough and demonstrate the operation of a scrubber device mounted on a mining machine for removing the impurities from the mine air in the entryway.

15 Claims, 5 Drawing Figures

METHOD AND APPARATUS FOR SIMULATING IN A MODEL THE DISBURSEMENT OF GAS AND DUST IN A MINE

BACKGROUND OF THE INVENTION

1. Field of the Invention

This invention relates to method and apparatus for simulating in a model the disbursement of dust and gas in a mine during the mining operation and more particularly to method and apparatus for simulating in a model the ventilation control in a mine entryway during a mining operation.

2. Description of the Prior Art

In the modern practice of continuous mining, mining machines move progressively and continuously through a mine entryway to dislodge solid material from the mine face. As a consequence of the continuous dislodgement of the material from the mine face, gas, specifically methane, carbon dioxide and hydrogen sulfide is emitted from the strata and dust is generated. These contaminants present substantial health hazards to personnel working in the mine. Pockets of gas which accumulate in the mine present a threat of explosion in the presence of a spark. The dust generated by the mining operation in the absence of ventilation air creates a deleterious working atmosphere for the personnel in the mine. Therefore, the presence of gas and dust in the mine requires specific measures for providing ventilation control to substantially remove these impurities from the mine and make it a safer and healthier place to work.

Among the methods and apparatus for controlling mine ventilation to reduce the hazards created by gas and dust emission during the continuous mining operation is the provision of supplying fresh air through a ventilation tube. The ventilation tube directs air upon the mine face to circulate the gas and dust away from the face by the flow of fresh air into an area of the entryway partitioned by a line brattice or brattice cloth. The impurities are diverted from the face behind the line brattice to an exhaust pipe. The continuous dislodging of solid material from the mine face provides for forward movement of the mining machine. Therefore, ventilation and exhaust pipes must be extensible to maintain their position adjacent the mine face.

An additional system for removing gas and dust emitted from the mine face during the mining operation includes a scrubber device that is mounted on the machine and movable with the machine during the mining operation as the mining machine sumps forwardly into the face and moves laterally thereto. The scrubber device withdraws the gas and dust emitted at the location of the mine face where the material is dislodged. The dust and gas collected in this manner may be withdrawn from the face through an exhaust tube or discharged into a partitioned section of the entryway to confine the gas and dust and direct it away from the mine face and out of the entryway.

There is need to provide in a model a simulation of the gas and dust emission from a mine face during the continuous mining operation to study and demonstrate the relative efficiency of the methods for removing the gas and dust from the mine face. The model should demonstrate the various methods of gas and dust collection and removal from the mine entryway. In this manner, it will be possible to efficiently study the various methods used in a mine to control ventilation and hence improve the working environment in a mine.

SUMMARY OF THE INVENTION

In accordance with the present invention, there is provided apparatus for simulating in a model the emission of gas and dust during a mining operation that includes a tank and a first conduit for conducting fluid into the tank. A housing is positioned in the tank and includes a pair of sidewalls and top and bottom walls connected thereto with a sealed end portion and an open end portion. A foraminous member is secured to the open end portion for directing fluid from the tank into the housing. Indicia medium is directed from the source at a controlled rate of flow through the foraminous member into mixture with the fluid in the housing for visually indicating the simulated emission of gas and dust from a mine face. A second conduit extends through the housing sealed end portion to a position adjacent the foraminous member for conveying at a preselected rate of flow the indicia medium and fluid from the housing.

The indicia medium is conveyed from a reservoir to the foraminous member through a supply conduit. A pump is connected to the supply conduit and controls the volume and rate of flow of the indicia medium conducted from the reservoir through the foraminous member into the housing. The fluid and indicia medium entering the housing through the foraminous member simulate the presence of gas and dust at the mine face. A separator device positioned in the housing adjacent the foraminous member diverts the flow of the indicia medium and fluid from the foraminous member in a controlled path through the housing to the inlet of the outlet conduit for removing the indicia medium and fluid from the housing. The separator device includes a partition which extends longitudinally in the housing adjacent one of the sidewalls thereof and has an extensible end portion that may be positioned at a preselected distance from the foraminous member. With this arrangement, it is possible to demonstrate and simulate with a model the effect of positioning a line brattice or brattice cloth in a mine entryway adjacent the mine face for diverting the gas and dust generated at the mine face during the mining operation away from the mine face.

By positioning the end portion of the partition a selected distance from the foraminous member and by withdrawing the fluid and indicia medium through the outlet conduit by a pump, a continuous flow of indicia medium and fluid is directed from the foraminous member into the area between the partition and sidewall of the housing. The flow pattern created is dependent upon the positioning of the end of the partition relative to the foraminous member and the rate at which the fluid and indicia medium is withdrawn from the housing through the outlet conduit. Preferably the rate of withdrawing the fluid and indicia medium from the housing through the outlet conduit is greater than the rate which the fluid and indicia medium is supplied to the housing throught the foraminous member. In this manner, the indicia medium and fluid continuously flow from the foraminous member to the partitioned area of the housing.

In a further embodiment of the present invention the partition is replaced by an outlet conduit having an end portion positioned adjacent the foraminous member. This arrangement simulates the effect of a ventilation tube that is positioned adjacent the mining machine and advanced forwardly within the entryway as the machine progressively dislodges material from the face. In the model, the indicia medium and fluid emitted into the housing through the foraminous member are directed into the inlet of the extended outlet conduit and withdrawn from the housing by the pump.

A scrubber device positioned on a continuous mining machine for removing gas and dust emitted during the mining operation is also simulated by the apparatus of the present invention and includes an exhaust conduit passing through the tank and into the housing and includes an expanded inlet that is movable laterally relative to the foraminous member. A pump is provided on the exhaust conduit, and the exhaust conduit includes an end portion through which the pump discharges the indicia medium and fluid from the foraminous member into the area divided by the partition. The fluid and indicia medium confined within the partitioned area of the housing is then discharged therefrom by the outlet conduit. The expanded inlet is movable laterally relative to the foraminous face and thereby simulates the operation of the scrubber device which is movable with the mining machine as it sumps inward and advances laterally of the face to collect the dust and gas generated at the location of the face where the mining machine is operating.

An additional embodiment of the present invention includes a simulation of a ventilation conduit for supplying fresh air to the mine face and an exhaust conduit for withdrawing the dust and gas generated during the mining operation from the mine face. As the indicia medium and fluid pass through the foraminous member, the simulated impurities are directed by the flow of fluid from the ventilation conduit toward the exhaust conduit having an end portion also positioned adjacent the foraminous member. This arrangement, simulates supplying fresh air to the mine face to dilute the concentration of impurities in the mine air and removing the purities from the mine face.

Accordingly, the principal object of the present invention is to provide a model for simulating the presence of gas and dust at the mine face and the flow of gas and dust from the mine face generated during the mining operation.

A further object of the present invention is to simulate in a model the emission of gas and dust from the mine face and diversion of the gas and dust from the mine face by a brattice cloth positioned in the mine adjacent the face.

A further object of the present invention is to provide a model for simulating a scrubber device that is positioned on a mining machine and movable therewith during the mining operation to remove the dust and gas as the impurities are generated from the mine face during the mining operation.

Another object of the present invention is to provide in a model simulation of supplying fresh air into a mine entryway and directed upon the mine face through a ventilation pipe and withdrawing by the flow of fresh air directed upon the mine face gas and dust emitted from the face during the mining operation through an exhaust tube having an inlet positioned adjacent the mine face.

These and other objects and advantages of the present invention will be more completely described and disclosed in the following specification, the accompanying drawings and the appended claims.

DESCRIPTION OF THE PREFERRED EMBODIMENTS

Figure 1:
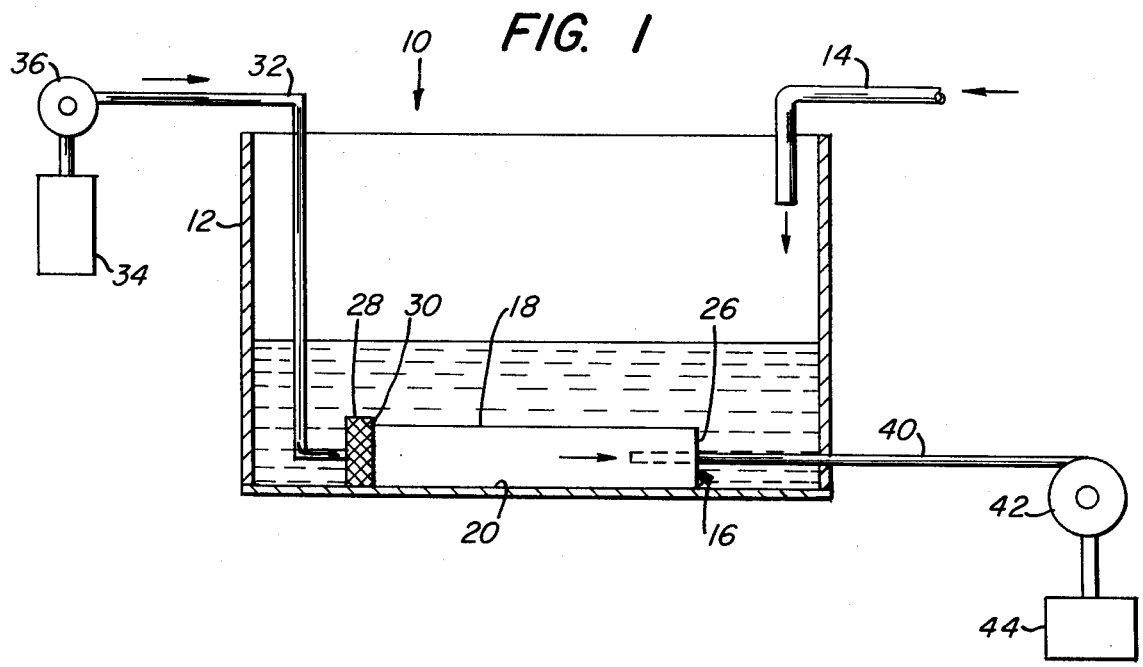
FIG. 1 is a schematic view in side elevation of a model for simulating the emission of gas and dust from a mine face during a mining operation, illustrating a water tank containing a housing with a foraminous member through which fluid and an indicia medium flow into the housing.
Figure 2:
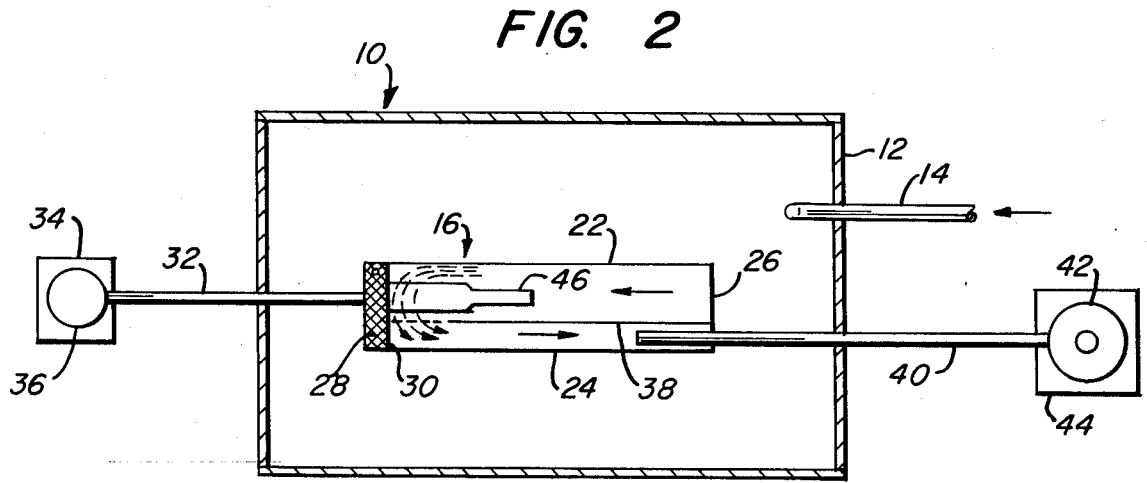
FIG. 2 is a top plan view similar to FIG. 1, illustrating schematically a continuous mining machine positioned adjacent the foraminous member of the housing and an extensible partition simulating a line brattice in a mine to control ventilation during the continuous mining operation.

Referring to the drawings and particularly to FIGS. 1 and 2, there is illustrated a model generally designated by the numeral 10 for simulating the emission of gases, such as $CH_4$, $CO_2$ and $H_2S$, and dust from a mine face during a mining operation. The model simulator 10 includes a tank 12 for receiving fluid such as water through an inlet conduit 14. A generally rectangular housing 16 is positioned within the tank on the floor thereof and includes top and bottom walls 18 and 20 and a pair of sidewalls 22 nd 24. Endwall 26 seals one end portion of the housing 16 and a foraminous member 28 seals open end portion 30 of the housing 16.

A supply conduit 32 conducts an indicia medium, such as a dye, mixed with a fluid, from a reservoir 34 to the foraminous member 28. A pump 36 discharges the indicia medium from the reservoir at a preselected rate of flow through the conduit 32 to the foraminous member 28. The foraminous member 28 includes a plurality of openings through which the fluid in the tank and the indicia from conduit 32 pass into the housing 16. The indicia medium enters the housing 16 in a continuous stream to simulate the emission of gas from the strata and dust from the mining operation. The indicia medium is distinguished from the other fluid entering the housing 16 through the foraminous member 28 by color and density. With this arrangement, the housing 16 simulates a mine entryway, and the indicia and fluid pass into the mixture with the fluid from the tank 12 to demonstrate the manner in which the air within the mine entryway becomes polluted with gas and dust emitted from the mine face during the mining operation.

As illustrated in FIGS. 1 and 2, the housing 16 simulates a mine entryway with a partition 38 extending longitudinally adjacent the sidewall 24 with the end portion of the partition 38 positioned adjacent the foraminous member 28. The partition 38 demonstrates the utilization of a line brattice to divide the entryway for diverting the polluted mine air from the face and out of the entryway. The end portion of the partition 38 adjacent the foraminous member 28 is extensible so that the distance between the end of the partition 38 and the foraminous member 28 may be adjusted and further to permit extension of the line brattice as the mining machine advances within the mine entryway.

As illustrated in FIG. 2, the partition 38 divides the area with the housing 16 and provides an opening defined by the partition 38 and sidewall 24 for diverting the indicia medium and fluid emitted through the foraminous member 28 away from the foraminous member 28. The simulated mine air impurities are conducted away from the member 28 and into the opening. An outlet or exhaust conduit 40 entends through the sealed end portion 26 of the housing 16, and an exhaust pump 42 is connected to the conduit 40. The indicia medium and fluid are exhausted from the partitioned area into the conduit 40 and out of the housing 16. The pump 42 discharges the fluids into a collection reservoir 44. Thus, with this arrangement mine ventilation by a line brattice and exhaust fan is simulated by the flow of fluid and the indicia medium through the foraminous member 28 into the housing 16 into the area defined by the partition 38 and sidewall 24 and out of the housing 16 through the conduit 40.

The flow pattern is schematically illustrated by the arrows in FIG. 2, and a mock-up of a continuous mining machine is shown positioned adjacent the foraminous member 28. As the mining machine dislodges material, dust is generated and gas is emitted from the strata. The line brattice and exhaust fan are operable to exhaust the polluted mine air from the face. The flow pattern is clearly illustrated within the housing 16 by the flow of indicia medium and the fluid away from the foraminous member 28 and into the area formed by the partition 38. Thus, the partition 38 and exhaust pump 42 are effective to illustrate ventilation in a mine by a line brattice and an exhaust fan.

In accordance with the practice of the present invention, the volume and rate of flow of indicia medium introduced into the housing 16 through the foraminous member 28 is controlled by the pump 36. Thus, it is possible to simulate variable flowrates of removing gas and dust from the mine face. By changing the rate of flow of the indicia medium to the foraminous member 28 by operation of pump 36 it is possible to control the volume of indicia medium emitted from the foraminous member 28. This simulates the collection of gas and dust at the mine face during the mining operation. In addition, the rate of flow of the pollutants from the mine face is simulated by the rate at which the pump 42 withdraws the fluid and indicia medium from the housing 16 through the conduit 40. If the flowrate through the exhaust conduit 40 is greater than the flowrate of the fluid and indicia medium through the foraminous member 28, then the simulated pollutants will not be permitted to collect at the foraminous member 28. With this arrangement it is possible to compare the rate of emission of the pollutants from the mine face with the rate of flow of the pollutants away from the mine face and study collection of the pollutants at the face.

The extensible provision of the partition 38 permits examination of the effect of positioning the end of a line brattice relative to the mine face has on mine ventilation. By varying the distance between the end of the partition 38 and the foraminous member 28, it is possible to control the flow pattern of the indicia medium from the foraminous member 28. Also, by changing the rate of flow of fluid through the outlet conduit 40, it is possible to determine the amount of gas and dust remaining adjacent the face for a given separation between the end of the partition 38 and foraminous member 28. The flow of the indicia medium from the foraminous member 28 clearly illustrates what effect the position of a line brattice has on the control of gas and dust flow from a mine face.

Figure 3:
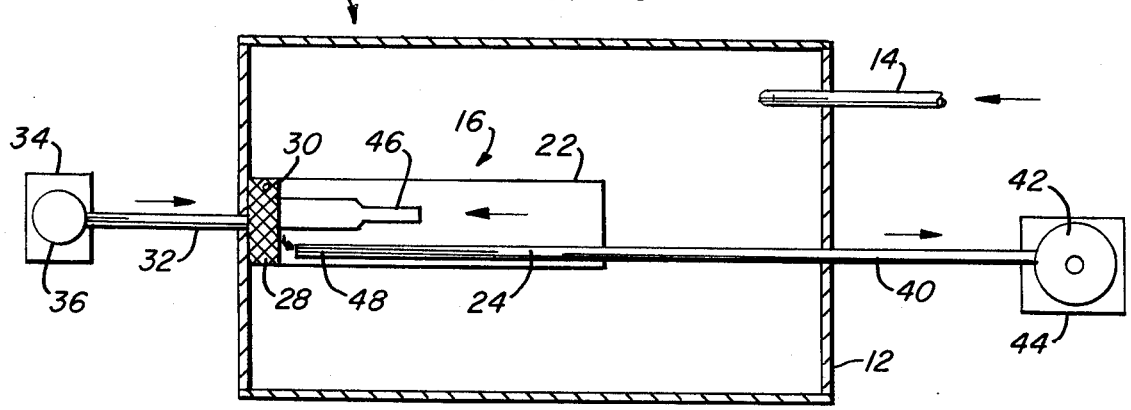
FIG. 3 is a top plan view similar to FIG. 2, illustrating a conduit extending through the end portion of the housing and to a position adjacent the foraminous member for simulating the method of extracting gas and dust from the mine face through a ventilation tube.

In the embodiment illustrated in FIG. 3, the extensible partition 38 is removed from housing 16 and the outlet conduit 40 is provided with an extended portion 48 having an end portion positioned adjacent the foraminous member 28. This arrangement simulates the operation of an exhaust fan and pipe to remove the gas and dust that accumulates at the face of the mine during the mining operation. The vent tube 48 is positioned adjacent the mining machine 46 and is operable in a mining operation to extend forwardly as the mining machine advances and dislodges the mineral from the mine face.

The pump 42 directs the indicia medium and fluid emitted from the foraminous member 28 into the end portion of the vent tube 48. The pump 42 is operable to withdraw the indicia medium and fluid from the housing 16 at a flowrate greater than the flowrate of emission of the indicia medium and fluid into the housing 16 through the foraminous member 28. With this arrangement, it is possible to vary the amount of indicia medium and fluid that remains at the face and thus simulate the amount of gas and dust which would remain at the face when an exhaust fan and pipe is used to air condition the mine entryway.

Figure 4:
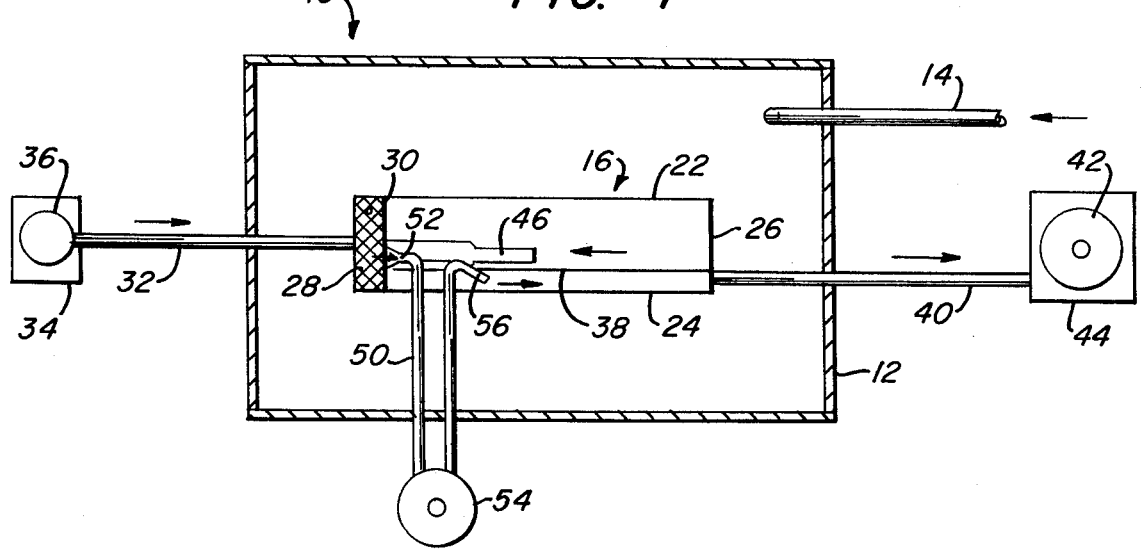
FIG. 4 is a top plan view of the model simulator, illustrating the operation of a scrubber device positioned on a continuous mining machine to extract the gas and dust emitted from the mine face as the machine dislodges solid material from the mine face.

The embodiment of the model simulator 10 illustrated in FIG. 4 demonstrates the operation of a scrubber device to air condition the mine air and includes the partition 38 for diverting the flow of indicia medium and fluid from the foraminous member 28. As described hereinabove the partition 38 has an extensible end portion by which the distance between the end of the partition 38 and the foraminous member 28 may be adjusted. the outlet or exhaust conduit 40 extends through the sealed end portion 26 of the housing 16 for discharging the indicia medium and fluid from between the partition 38 and the sidewall 24. The scrubber device is simulated by an exhaust conduit 50 having an expanded inlet portion 52 that is positioned in substantially abutting relation with the foraminous member 28. The conduit 50 and inlet portion 52 are arranged for lateral movement adjacent the foraminous member 28 between the sidewalls 22 and 24.

The exhaust conduit 50 is connected to a pump 54 that is positioned externally of the interior of the tank 12. The exhaust conduit 50 passes through the housing 16 and tank 12 and connects to the pump 54. An outlet portion 56 of the conduit 50 is connected to the pump 54 and extends through the tank 12 and housing 16. An end portion of outlet conduit 56 discharges the indicia medium and fluid into the partitioned section of the housing 16. Thus, the pump 54 and exhaust conduit 50 with expanded inlet 52 illustrate the operation of a scrubber device positioned on a continuous mining machine and movable therewith for withdrawing the gas and dust emitted from the mine face during the mining operation. By advancing the expanded outlet 52 laterally across the foraminous member 28 between the housing sidewalls 22 and 24, it is possible to demonstrate the movement of the scrubber device on a mining machine during the mining operation.

The indicia medium and fluid emitted through the foraminous member 28 are drawn into the expanded inlet 52 by the pump 54 and conveyed to the partitioned section of the housing 16. The fluid and indicia medium discharged into the partitioned are of the housing 16 are withdrawn through the outlet conduit 40 by the pump 42 and directed from the housing 16 to the reservoir 44. By adjusting the flowrates through the pumps 42 and 54, it is possible to vary the volume of indicia medium and fluid that remains at the foraminous member 28. By withdrawing the fluid and indicia medium from the foraminous member 28 at a flowrate greater than the rate of emission from the foraminous member 28 the indicia medium will not be permitted to accumulate there. The provision of laterally moving the expanded inlet 52 relative to the foraminous member 28 permits simulated movement of the scrubber device on the mining machine and withdrawal of gas and dust from that portion of the face as the mining machine dislodges material.

Figure 5:
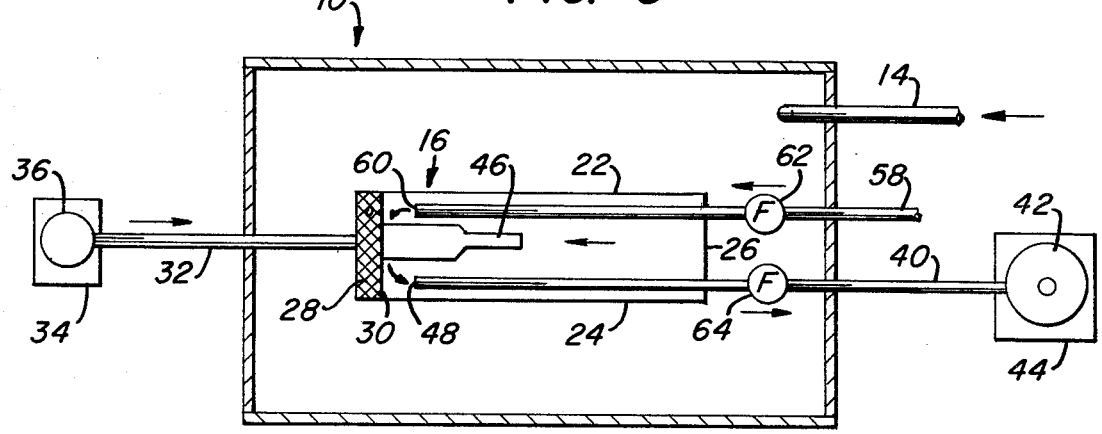
FIG. 5 is a top plan view of the model simulator, illustrating an inlet conduit through which fluid simulating fresh air is discharged and directed at the foraminous member and an outlet conduit through which simulated gas and dust are withdrawn by the circulating air from the mine face.

Referring to FIG. 5, there is illustrated an additional embodiment of the present invention which includes an inlet or ventilation conduit 58 extending through the sealed end portion 26 into the housing 16. An outlet end portion 60 of conduit 58 is positioned adjacent the foraminous member 28. With this arrangement, fluid simulating ventilation air is conducted into the housing 16 adjacent the foraminous member 28. The inlet conduit 58 includes a flow meter 62 for measuring the flowrate of the fluid entering the housing 16 and supplied adjacent to the foraminous member 28. As the fluid is directed upon the foraminous member 28 within the housing 16, the outlet or exhaust conduit 40 directs the fluid and the indicia medium into the conduit end portion 48 and out of the housing 16.

An additional flow meter 64 is provided on the outlet conduit 40 for measuring the flowrate of the fluid and indicia medium exhausted from the housing 16. With this arrangement, supplying fluid simulating ventilation air, to the foraminous member 28 through conduit 58 and diverting the indicia medium and fluid therefrom by the simulated ventilation air through outlet conduit 40 creates a continuous flow across the foraminous member 28 from the conduit 58 to the conduit 40. As the indicia medium and fluid enter the housing 16 through the foraminous member 28, the flow across the face of the foraminous member 28 diverts the indicia medium and fluid to the exhaust conduit 40. This arrangement simulates the mine ventilation system of supplying fresh air through a ventilation pipe into the mine entryway and directed upon the mine face for diluting the concentration of dust and gas that accumulates at the face during the mining operation. The outlet conduit 40 demonstrates the operation of the exhaust pipe to remove the dust and gas accumulated at the mine face by the circulation of fresh air across the face and into the exhaust pipe. The operation of the pump 42 withdraws the gas and dust from the simulated mine entryway.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:
1. Apparatus for simulating in a model the emission of gas and dust during a mining operation comprising,
a tank,
first conduit means for conducting fluid into said tank,
a housing positioned in said tank,
said housing having a pair of sidewalls and top and bottom walls connected thereto with a sealed end portion and an open end portion,
a foraminous member secured to said open end portion for directing fluid from the tank into said housing,
indicia means passing at a controlled rate of flow through said foraminous member into mixture with said fluid in said housing for visually indicating the simulated emission of gas and dust from a mine face, and
second conduit means extending through said housing sealed end portion and positioned adjacent one of said housing sidewalls for conveying said indicia means and said fluid from said housing.

2. Apparatus for simulating in a model the emission of gas and dust during a mining operation as set forth in claim 1 which includes,
third conduit means for supplying said indicia means from a source to said foraminous member.

3. Apparatus for simulating in a model the emission of gas and dust during a mining operation as set forth in claim 2 which includes,
pump means connected to said third conduit means for controlling the volume and flowrate of said indicia means from a source to said foraminous member.

4. Apparatus for simulating in a model the emission of gas and dust during a mining operation as set forth in claim 1 which includes,
separator means positioned in said housing adjacent said foraminous member for diverting flow of said indicia means from said foraminous member in a controlled path through said housing to said second conduit means for removal from said housing.

5. Apparatus for simulating in a model the emission of gas and dust during a mining operation as set forth in claim 4 in which said separator means includes,
a partition positioned in said housing and extending longitudinally therein adjacent one of said housing sidewalls such that said second conduit means is positioned between said partition and said housing sidewall,
said partition having an extensible end portion for positioning at a preselected distance from said foraminous member to control the flow of said indicia means from said foraminous member between said partition and said housing sidewall to said second conduit means, and
said partition being longitudinally adjustable within said housing to provide a variable distance between the front end portion of said partition and said foraminous member for diverting said indicia means away from said foraminous member.

6. Apparatus for simulating in a model the emission of gas and dust during a mining operation as set forth in claim 1 which includes, said second conduit means having an end portion positioned adjacent said foraminous member, and pump means connected to said second conduit means for withdrawing said indicia means and fluid passing through said foraminous member out of said housing at a rate of flow greater than the rate of flow of said fluid into said tank.

7. Apparatus for simulating in a model the emission of gas and dust during a mining operation as set forth in claim 1 which includes, a partition positioned in said housing and extending longitudinally therein adjacent one of said housing sidewalls such that said second conduit means is positioned between said partition and said housing sidewall, said partition having an extensible end portion for positioning at a preselected distance from said foraminous member to control the flow of said indicia means from said foraminous member between said partition and said housing sidewall to said second conduit means, an exhaust conduit having an expanded inlet portion positioned for lateral movement adjacent said foraminous member and an outlet positioned between said partition and one of said housing sidewalls, and pump means connected to said exhaust conduit between said inlet and said outlet, said pump means operable to convey said indicia means emitted from said foraminous member through said exhaust conduit inlet and to discharge said indicia means from said exhaust conduit outlet between said partition and said housing sidewall for removal from said housing through said second conduit means.

8. Apparatus for simulating in a model the emission of gas and dust during a mining operation as set forth in claim 1 which includes, fourth conduit means extending through said housing sealed end portion and parallel to said second conduit means adjacent the opposite sidewall of said housing, said fourth conduit means having an outlet end portion positioned adjacent said foraminous member for supplying fluid thereto to circulate the flow of said indicia means from said foraminous member to said second conduit means and out of said housing, and means provided on said second and fourth conduit means for measuring the flowrate of said fluid therethrough.

9. Method for simulating in a model the emission of gas and dust during a mining operation comprising, feeding fluid from a source into a tank at a preselected rate of flow, feeding indicia medium from a source into said tank at a preselected rate of flow, conducting said indicia medium through a foraminous member into a housing positioned in said tank, conducting said fluid from said tank into said housing through said foraminous member, diverting said indicia medium and fluid in a controlled path away from said foraminous member, and thereafter withdrawing said indicia medium in a controlled path through an outlet conduit away from said foraminous member and out of said housing at a flowrate greater than the flowrate of said indicia medium into said housing.

10. Method for simulating in a model the emission of gas and dust during a mining operation as set forth in claim 9 which includes, changing the rate of flow of said indicia medium and fluid through said outlet conduit to vary the amount of indicia medium remaining adjacent the foraminous member within said housing.

11. Method for simulating in a model the emission of gas and dust during a mining operation as set forth in claim 9 which includes, directing said flow of indicia medium and fluid away from said foraminous member in a controlled path through a partitioned area of said housing.

12. Method for simulating in a model the emission of gas and dust during a mining operation as set forth in claim 9 which includes, withdrawing said indicia medium and fluid emitted from said foraminous member through a conduit having an open end portion positioned adjacent said foraminous member and out of said housing.

13. Method for simulating in a model the emission of gas and dust during a mining operation as set forth in claim 9 which includes, withdrawing said indicia medium and fluid emitted from said foraminous member through an expanded inlet of an exhaust conduit positioned adjacent said foraminous member, directing said fluid and indicia medium through said conduit away from said foraminous member, discharging said indicia medium and fluid from said conduit into a partitioned area of said housing, and withdrawing said indicia medium and fluid from said partitioned section and out of said housing.

14. Method for simulating in a model the emission of gas and dust during a mining operation as set forth in claim 9 which includes, supplying fluid at a preselected rate of flow from a fourth conduit into said housing and adjacent said foraminous member, circulating said indicia medium away from said foraminous member by the flow of said fluid from said fourth conduit toward and away said foraminous member, introducing the flow of said indicia medium and fluid into a fifth conduit, and thereafter conveying said indicia medium and fluid through said fifth conduit away from said foraminous member and out of said housing at a preselected rate of flow.

15. Method for simulating in a model the emission of gas and dust during a mining operation as set forth in claim 9 which includes, changing the volume and rate of flow of said indicia medium to said foraminous member to control the volume and rate of flow of said indicia medium therefrom, and changing the rate of flow of said indicia medium from said foraminous member to control the volume of said indicia medium remaining adjacent the foraminous member.

\* \* \* \* \*